(12) United States Patent
Motoki et al.

(10) Patent No.: US 9,111,690 B2
(45) Date of Patent: Aug. 18, 2015

(54) MULTILAYER ELECTRONIC COMPONENT

(75) Inventors: Akihiro Motoki, Fukui (JP); Makoto Ogawa, Fukui (JP); Toshiyuki Iwanaga, Sabae (JP); Akihiro Yoshida, Echizen (JP); Takayuki Kayatani, Echizen (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 664 days.

(21) Appl. No.: 12/543,549

(22) Filed: Aug. 19, 2009

(65) Prior Publication Data

US 2010/0091426 A1    Apr. 15, 2010

(30) Foreign Application Priority Data

Oct. 9, 2008   (JP) ................................ 2008-262731

(51) Int. Cl.
   *H01G 4/30*      (2006.01)
   *H01G 4/232*     (2006.01)
   *H01C 1/148*     (2006.01)
   *H01C 7/18*      (2006.01)

(52) U.S. Cl.
   CPC .............. *H01G 4/2325* (2013.01); *H01C 1/148* (2013.01); *H01C 7/18* (2013.01); *H01G 4/30* (2013.01); *Y10T 29/435* (2015.01)

(58) Field of Classification Search
   CPC .................................. H01G 4/30; H01G 4/232
   USPC ............. 361/321.4, 306.1, 306.3, 301.4, 303, 361/312, 301.5
   See application file for complete search history.

(56) References Cited

U.S. PATENT DOCUMENTS 6,621,682 B1 *  9/2003  Takakuwa et al. ......... 361/306.3
6,960,366 B2   11/2005  Ritter et al.
6,972,942 B2   12/2005  Ritter et al.
(Continued)

FOREIGN PATENT DOCUMENTS

JP      63-169014 A     7/1988
JP      2000-138129 A   5/2000
(Continued)

OTHER PUBLICATIONS

Official Communication issued in corresponding Japanese Patent Application No. 2008-262731, mailed on Dec. 4, 2012.
(Continued)

*Primary Examiner* — Robert J Hoffberg
*Assistant Examiner* — Hung Dang
(74) *Attorney, Agent, or Firm* — Keating & Bennett, LLP

(57) ABSTRACT

A method is used to manufacture a multilayer electronic component including a multilayer composite including internal electrodes having ends that are exposed at a predetermined surface of the multilayer composite. In the method, the exposed ends of the internal electrodes are coated with a metal film primarily composed of at least one metal selected from the group consisting of Pd, Au, Pt and Ag and having a thickness of at least about 0.1 μm by immersing the multilayer composite in a liquid containing a metal ion or a metal complex. Then, a continuous plating layer is formed by depositing a plating metal on the ends of the internal electrodes exposed at the predetermined surface of the multilayer composite, and subsequently growing the deposits of the plating metal so as to be connected to each other. Thus, exposed ends of the internal electrodes are electrically connected to each other.

2 Claims, 6 Drawing Sheets

(56) References Cited

U.S. PATENT DOCUMENTS

| | | | |
|---|---|---|---|
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 7,463,474 B2* | 12/2008 | Ritter et al. | 361/306.1 |
| 7,589,951 B2* | 9/2009 | Kunishi et al. | 361/306.3 |
| 7,589,952 B2* | 9/2009 | Motoki et al. | 361/306.3 |
| 2005/0046536 A1 | 3/2005 | Ritter et al. | |
| 2006/0245141 A1 | 11/2006 | Shirasu et al. | |
| 2007/0014075 A1 | 1/2007 | Ritter et al. | |
| 2008/0123248 A1 | 5/2008 | Kunishi et al. | |
| 2008/0123249 A1 | 5/2008 | Kunishi et al. | |
| 2008/0145551 A1* | 6/2008 | Kunishi et al. | 427/430.1 |
| 2008/0158774 A1 | 7/2008 | Trinh | |
| 2008/0210564 A1 | 9/2008 | Motoki et al. | |

FOREIGN PATENT DOCUMENTS

| | | |
|---|---|---|
| JP | 2000-306763 A | 11/2000 |
| JP | 2006-332601 A | 12/2006 |
| WO | 2007/105395 A1 | 9/2007 |
| WO | 2008/059666 A1 | 5/2008 |

OTHER PUBLICATIONS

Official Communication issued in corresponding Japanese Patent Application No. 2008-262731, mailed on Jun. 25, 2013.

Official Communication issued in corresponding Japanese Patent Application No. 2013-269833, mailed on Aug. 26, 2014.

* cited by examiner

US 9,111,690 B2

MULTILAYER ELECTRONIC COMPONENT

BACKGROUND OF THE INVENTION

1. Field of the Invention

The present invention relates to multilayer electronic components and methods for manufacturing the same, and particularly to a multilayer electronic component including external electrodes formed directly on the external surface of a multilayer composite by plating, and a method for manufacturing the same.

2. Description of the Related Art

As shown in FIG. 6, a multilayer electronic component 101, which is represented by a monolithic capacitor, includes a multilayer composite 102 including a stack of a plurality of insulating layers 103 and layers of internal electrodes 104 and 105 disposed along the interfaces between the insulating layers 103. One end of each of the internal electrodes 104 is exposed at the surface of one side 106 of the multilayer composite 102, and one end of each of the internal electrodes 105 is exposed at the surface of the other side 107 of the multilayer composite 102. The exposed ends of the internal electrodes 104 are electrically connected to each other by an external electrode, and the exposed ends of the internal electrodes 105 are also electrically connected to each other by another external electrode.

To form the external electrodes, a metal paste including a metal and glass components is applied onto the side surfaces 106 and 107 of the multilayer composite 102 and is then sintered, thus forming paste electrode layers 108 and 109. Then, for example, Ni-based first plating layers 110 and 111 are formed on the paste electrode layers 108 and 109, respectively, and subsequently, for example, Sn-based second plating layers 112 and 113 are formed on the first plating layers 110 and 111, respectively. Thus, each external electrode has a three-layer structure including the paste electrode layer 108 or 109, the first plating layer 110 or 111 and the second plating layer 112 or 113.

To facilitate mounting of the multilayer electronic component 101 on a substrate with solder, it is preferable that the external electrode has high solder wettability. It is also required that the external electrode electrically connects the internal electrodes isolated from each other. The second plating layers 112 and 113 ensure a sufficient solder wettability, and the paste electrode layers 108 and 109 electrically connect the internal electrodes to each other. The first plating layers 110 and 111 function as primary coatings which prevent solder corrosion that may be caused by solder bonding.

Unfortunately, the paste electrode layers 108 and 109 have a thickness of several tens of micrometers to several hundreds of micrometers. In order for the multilayer electronic component to satisfy certain dimensional specifications, a certain volume of the paste electrode layer must be ensured. Accordingly, the effective volume of the paste electrode layer must be undesirably reduced to ensure a sufficient capacitance. On the other hand, the first plating layers 110 and 111 and the second plating layers 112 and 113 typically have thicknesses of several micrometers. If the external electrode can be composed of only these plating layers, a larger effective volume can be achieved to ensure a sufficient capacitance.

For example, Japanese Unexamined Patent Application Publication No. 63-169014 discloses a technique of depositing an electroconductive metal layer by electroless plating over the entire side surfaces of a multilayer composite at which internal electrodes are exposed, thereby short-circuiting the internal electrode layers at the internal electrode-exposed side surfaces.

In the multilayer electronic component disclosed in Japanese Unexamined Patent Application Publication No. 63-169014, if the internal electrodes are made of a noble metal, the plating layers can be deposited without problems. However, if the internal electrodes are made of a base metal, such as Ni or Cu, it is difficult to deposit the plating metal and to form uniform plating layers because of the oxidation of the base metal at the ends of the internal electrodes. In order to prevent the occurrence of this problem, the oxide layers on the ends of the internal electrodes can be removed by polishing, or the exposed portions of the internal electrodes may be increased. However, both approaches are disadvantageously difficult to control.

SUMMARY OF THE INVENTION

To overcome the problems described above, preferred embodiments of the present invention provide a multilayer electronic component and a method for manufacturing a multilayer electronic component in which the plating layers can be uniformly formed.

According to a preferred embodiment of the present invention, a multilayer electronic component includes a multilayer composite and a plating layer disposed on a surface of the multilayer composite. The multilayer composite includes a stack of a plurality of insulating layers and a plurality of internal electrodes primarily composed of a base metal and extending along the interfaces between the insulating layers. One end of each internal electrode is exposed at a predetermined surface of the multilayer composite. The plating layer is directly disposed on the predetermined surface of the multilayer composite so as to electrically connect the exposed ends of the internal electrodes. The exposed ends of the internal electrodes are preferably covered with a metal film primarily composed of at least one metal selected from the group consisting of Pd, Au, Pt and Ag, for example, and having a thickness of at least about 0.1 μm, for example.

More preferably, the base metal of the internal electrodes is Ni or Cu, for example.

A method according to another preferred embodiment of the present invention includes the steps of preparing a multilayer composite including a stack of a plurality of insulating layers and a plurality of internal electrodes primarily composed of a base metal and extending along the interfaces between the insulating layers with one end of each internal electrode exposed at a predetermined surface of the multilayer composite, coating the exposed ends of the internal electrodes with a metal film preferably primarily composed of at least one metal selected from the group consisting of Pd, Au, Pt and Ag, for example, and having a thickness of at least about 0.1 μm by immersing the multilayer composite in a liquid including a metal ion or a metal complex, and forming a continuous plating layer by forming deposits of a plating metal on the ends of the internal electrodes exposed at the predetermined surface of the multilayer composite, and growing the deposits of the plating metal so as to be connected to each other, thereby electrically connecting the exposed ends of the internal electrodes.

Since the exposed ends of the internal electrodes are coated with a noble metal in the multilayer electronic component and the method for manufacturing a multilayer electronic component, an oxide film is not formed on the exposed ends of the internal electrode. Consequently, a plating metal can be uniformly deposited to form a uniform plating layer by plating the internal electrode-exposing surface.

If the ends of the internal electrodes are recessed from the internal electrode-exposing surface, the noble metal film can preferably be formed to a relatively large thickness so as to omit the step of exposing the recessed ends of the internal electrode.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

A multilayer electronic component 1 according to a preferred embodiment of the present invention will now be described with reference to FIG. 1.

Figure 1:
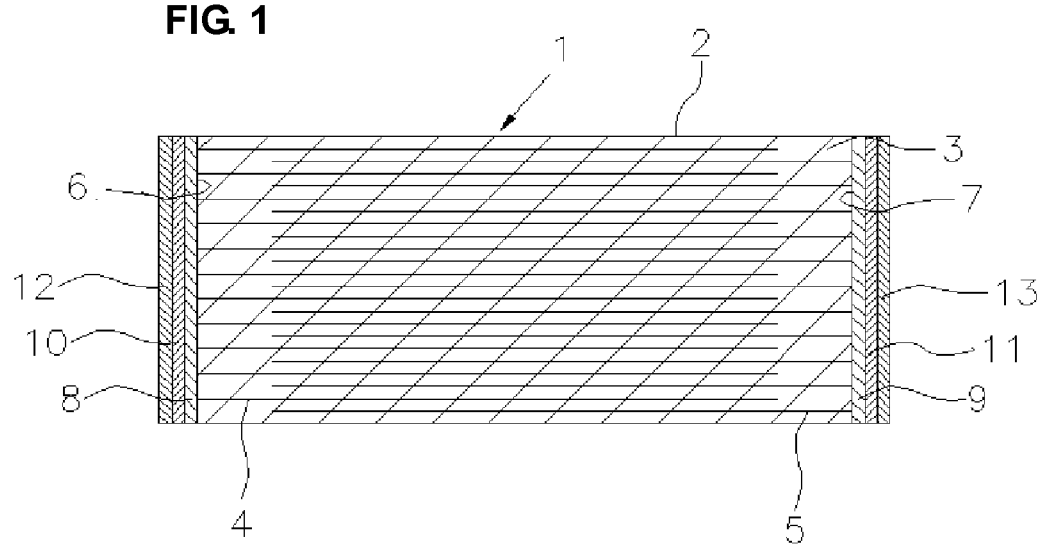
FIG. 1 is a sectional view of a multilayer electronic component according to a preferred embodiment of the present invention.

As shown in FIG. 1, the multilayer electronic component 1 includes a multilayer composite 2 including a stack of a plurality of insulating layers 3 and layers of internal electrodes 4 and 5 disposed along the interfaces between the insulating layers 3. If the multilayer electronic component 1 defines a monolithic ceramic capacitor, the insulating layer 3 is preferably made of a dielectric insulating material. One end of each of the internal electrodes 4 is exposed at the surface of one side 6 of the multilayer composite 2, and one end of each of the internal electrodes 5 is exposed at the surface of the other side 7 of the multilayer composite 2. The exposed ends of the internal electrodes 4 are electrically connected to each other by a plating layer defining an external electrode, and the exposed ends of the internal electrodes 5 are also electrically connected to another plating layer defining another external electrode.

The internal electrodes are preferably primarily composed of a base metal, such as Ni or Cu, or its alloy, for example.

The plating layer may be defined by a single layer, or may include a plurality of layers. Each of the plating layers of the multilayer electronic component 1 shown in FIG. 1 has a three-layer structure including a first plating layer 8, a second plating layer 10 and a third plating layers 12, or a first plating layer 9, a second plating layer 11 and a third plating layer 13. These plating layers may preferably be formed by electroplating or electroless plating, for example. However, the plating layers are not formed by vacuum deposition, such as sputtering or vapor deposition, or by sintering a metal paste containing glass. The metals of the plating layers are not particularly limited. For example, the first plating layers 8 and 9 may preferably be made of Cu, for example, which can from a uniform coating. The second plating layers 10 and 11 may preferably be made of Ni, for example, which can prevent solder corrosion. The third plating layers 12 and 13 may preferably be made of Sn or Au, for example, which has superior solder wettability.

The exposed ends of the internal electrodes 4 and 5 are covered with a metal film 21 (see Figs. 3-5, not shown in FIG. 1) preferably having a thickness of at least about 0.1 μm, for example, primarily composed of at least one metal selected from the group consisting of Pd, Au, Pt and Ag, for example. The first plating layers 8 and 9 disposed over the respective side surfaces 6 and 7 of the multilayer composite 2 are electrically connected to the internal electrodes 4 and 5, with the metal films 21 therebetween.

If the thickness of the metal film 21 is less than about 0.1 μm, the ends of the internal electrodes 4 and 5 can be easily oxidized.

If the ends of the internal electrodes 4 and 5 are recessed from the side surfaces 6 and 7, the recesses can be filled by increasing the thickness of the metal film 21. Thus, the plating metal can be easily deposited on the ends of the internal electrodes 4 and 5.

However, it is preferable that the metal film 21 be provided only on the exposed ends of the internal electrodes 4 and 5. Thus, it is not preferable that the metal film 21 be formed on the ends of the insulating layers 3 at the side surfaces 6 and 7. Otherwise, the adhesion of the first plating layers 8 and 9 may be reduced.

While the present invention has been described with reference to a preferred embodiment with reference to FIG. 1, it is to be understood that the present invention is not limited to the disclosed exemplary preferred embodiment and various modifications may be made without departing from the scope of the present invention.

The multilayer electronic component can be a multilayer chip capacitor, but may be applied to other components, such as multilayer chip inductors and multilayer chip thermistors, for example.

Accordingly, the material of the insulating layers of the multilayer electronic component is not particularly limited as long as it is electrically insulating. Thus, the insulating layer may be made of not only a dielectric insulating material, but also other insulating materials, such as piezoelectric insulating materials, semiconductor insulating materials and magnetic insulating materials, for example.

Although the external electrode of the multilayer electronic component according to a preferred embodiment of the present invention is substantially made of plating layers, a paste may preferably be used to form a portion of the external electrode not directly involved in the connection of the plurality of internal electrodes. For example, if the external electrode extends from the internal electrode-exposing surface to an adjacent surface, such an extension electrode may be formed to have a large thickness by applying a paste. The thick paste electrode facilitates solder mounting and prevents the permeation of moisture from the edge of the plating layer effectively.

Although in the multilayer electronic component shown in FIG. 1, the layers of the internal electrodes are not protected by protective layers provided at both external sides of the electrode layers, such protective layers may be provided to improve the reliability. In this instance, the plating layer can preferably be formed by exposing a dummy electrode at the surface of the protective layer. The same applies to the portions of the external electrodes folding over sides of the multilayer composite as well as the protective layers.

Although the multilayer electronic component shown in FIG. 1 includes two-terminal type external electrodes, a greater number of external electrodes may be used. In a preferred embodiment, for example, array-type external electrodes including a plurality of pairs of external electrodes may preferably be used.

A method for manufacturing the multilayer electronic component according to a preferred embodiment of the present invention will now be described with reference to FIG. 1 and FIGS. 2 to 5. FIGS. 2 to 5 are fragmentary enlarged views of a portion in which the internal electrodes 4 are exposed at a side surface 6 of a multilayer composite 2.

Figure 2:
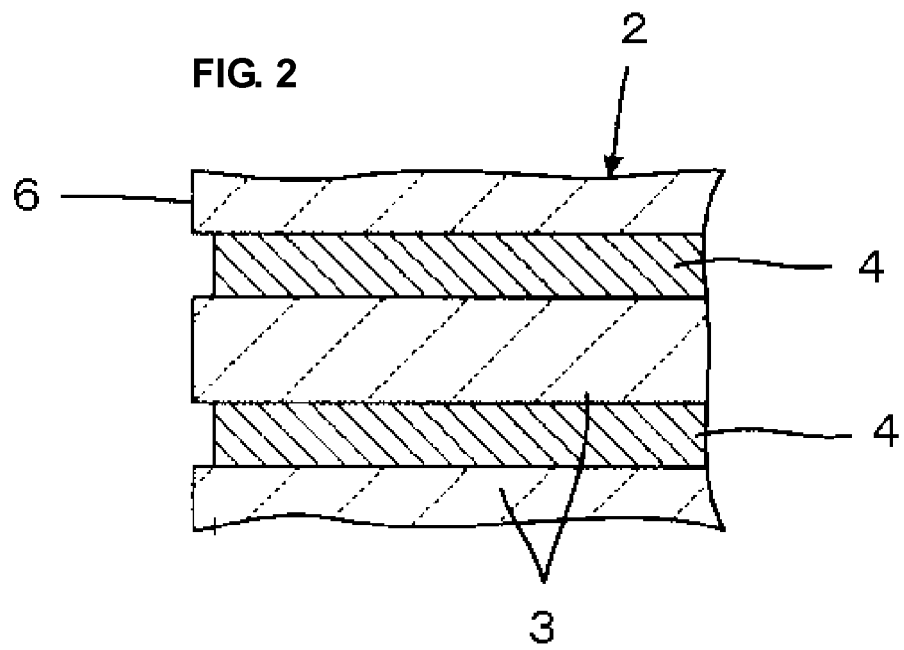
FIG. 2 is a fragmentary enlarged view of a side surface of the multilayer electronic component, showing a state before forming an external electrode.

As shown in FIG. 2, first, the multilayer composite 2 is prepared which includes a stack of insulating layers 3 and a plurality of internal electrodes 4 (and 5) primarily composed of a base metal and extending along the interfaces between the insulating layers 3. The internal electrodes 4 are exposed at a side surface 6 of the multilayer composite 2.

Figure 3:
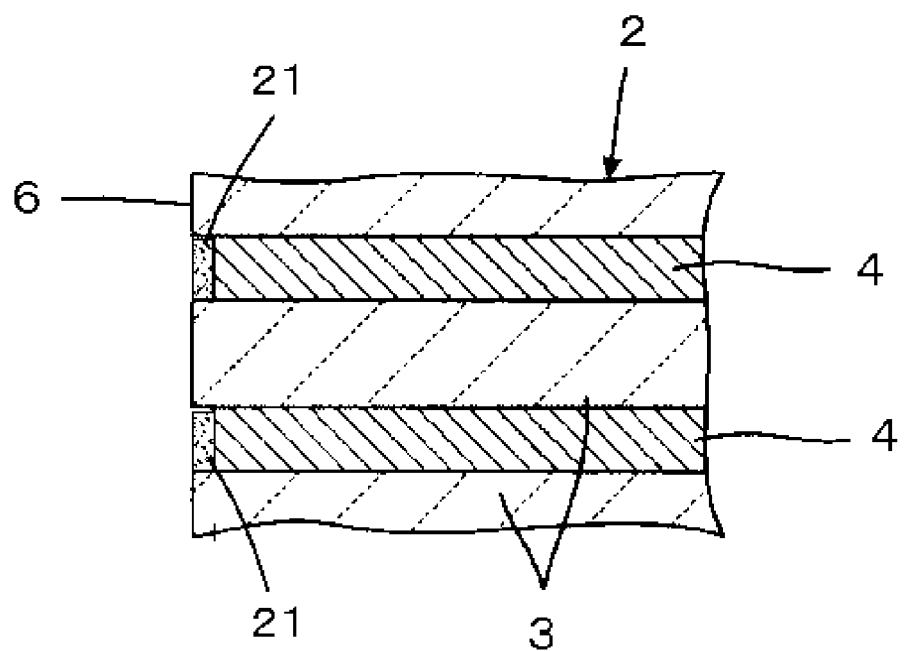
FIG. 3 is a fragmentary enlarged view of the side surface of the multilayer electronic component, showing a state in which metal films have been formed.

The multilayer composite 2 is then immersed in a liquid containing an ion or a complex of at least one metal selected from the group consisting of Pd, Au, Pt and Ag, for example, so that a metal film 21 primarily composed of at least one metal selected from the group consisting of Pd, Au, Pt and Ag is formed on one ends of the internal electrodes 4 (and 5), as shown in FIG. 3.

The metal film 21 may be formed by, but not limited to, a substitution reaction between the base metal forming the internal electrodes 4 and the noble metal forming the metal film 21. Alternatively, the liquid may include a reducing agent that allows the base metal of the internal electrodes 4 to act as a catalyst so that the metal film 21 can be deposited through the agency of the reducing agent.

If the ends of the internal electrodes 4 are recessed from the side surface 6, it is preferable that the metal film 21 be formed to have a relatively large thickness. In this instance, a voltage may be applied to the internal electrodes 4 to forcibly deposit the metal, following the substitution reaction or the deposition using the reducing agent, thereby increasing the thickness of the metal film 21.

Subsequently, a first plating layer 8 is formed over the side surface 6 of the multilayer composite 2 so that the ends of the internal electrodes 4 exposed at the side surface 6 of the multilayer composite 2 are electrically connected to each other.

Figure 4:
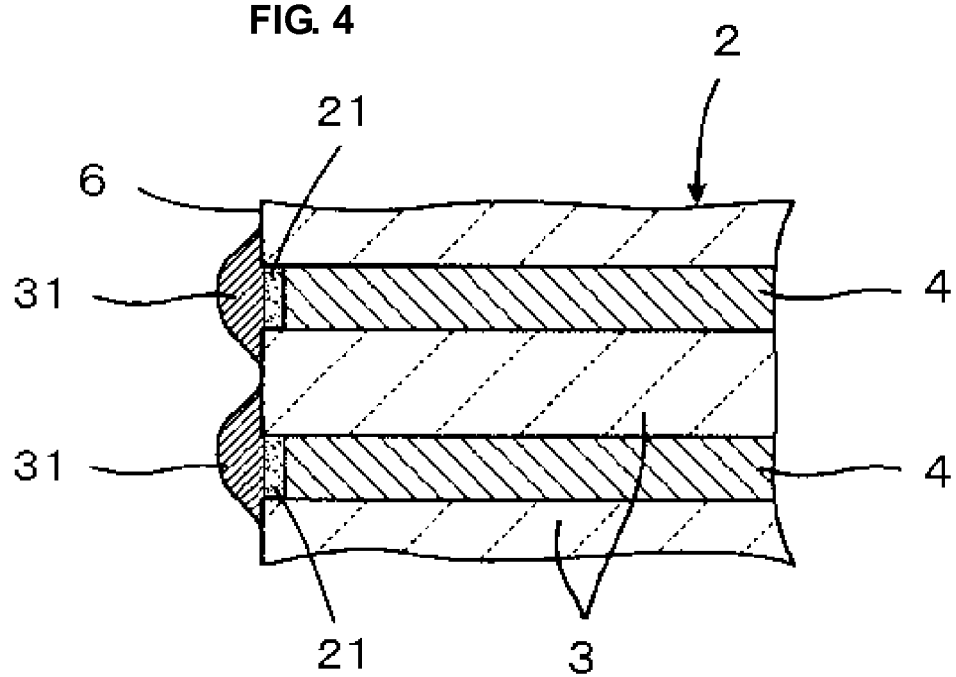
FIG. 4 is a fragmentary enlarged view of the side surface of the multilayer electronic component, showing a state in which a plating metal has been deposited.
Figure 5:
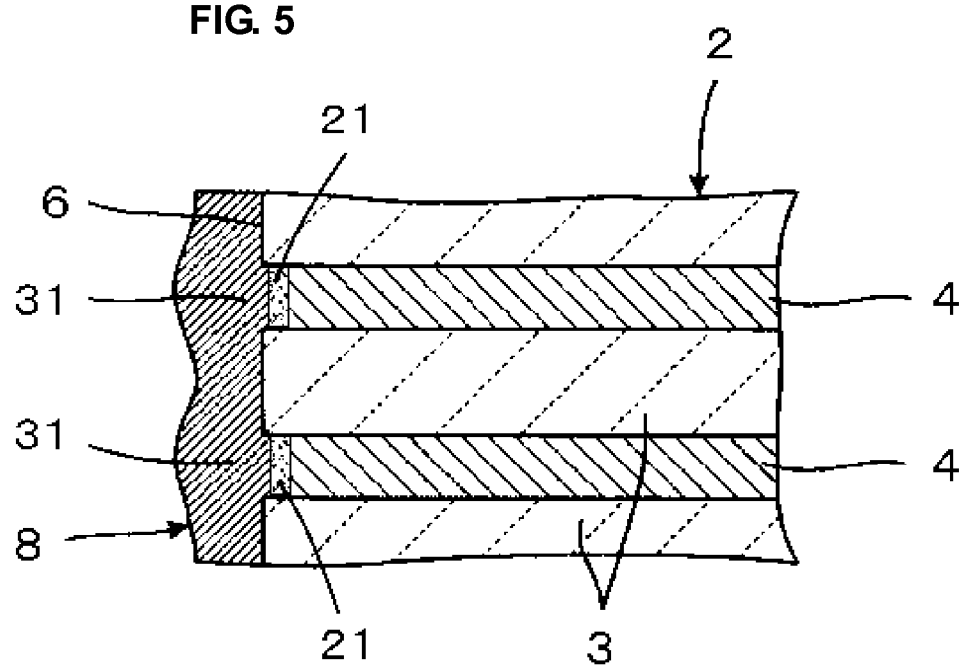
FIG. 5 is a fragmentary enlarged view of the side surface of the multilayer electronic component, showing a state in which a first plating layer has been formed.
Figure 6:
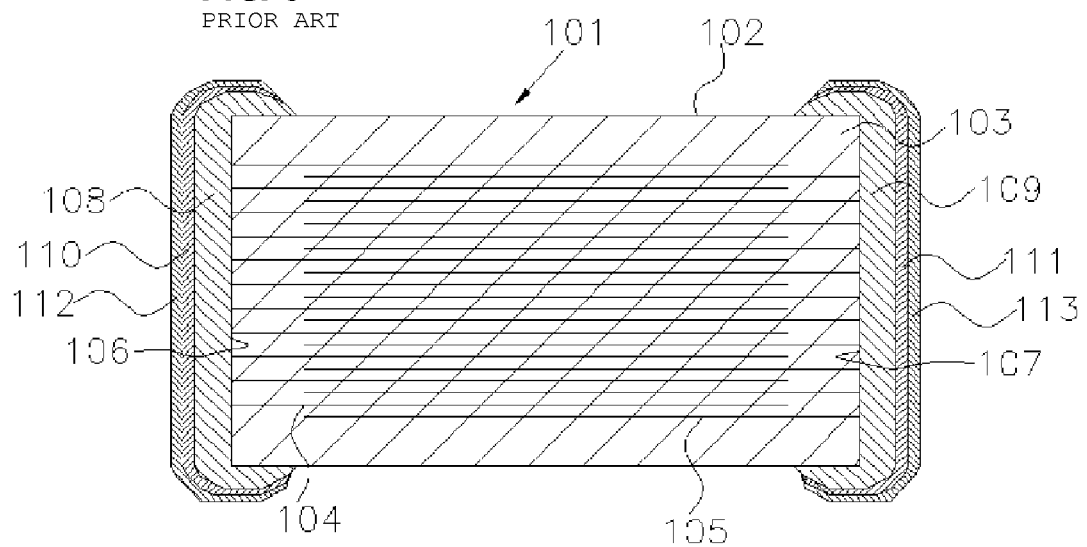
FIG. 6 is a sectional view of a known multilayer electronic component.

In the step of forming the first plating layer 8 on the multilayer composite 2 having the metal films 21, first, a plating metal 31 is deposited on the ends of the internal electrodes 4 exposed at the side surface 6 of the multilayer composite 2, that is, on the metal films 21, as shown in FIG. 4. Then, the deposits of the plating metal 31 are grown to be connected to adjacent deposits, thereby forming a continuous first plating layer 8 directly on the side surface 6 of the multilayer composite 2, as shown in FIG. 5.

Thus, the first plating layers 8 and 9 are formed by the growing force of the deposits of the plating metal and their high malleability. From the viewpoint of easy connection between the deposits of the plating metal, the thickness between the adjacent internal electrodes can preferably be about 50 μm or less, more preferably about 20 μm or less, and even more preferably about 10 μm or less, for example.

The plating method for forming the first plating layers 8 and 9 may be performed by electroplating or electroless plating. If electroless plating is used, the metal included in the metal film 21 preferably acts as a catalyst of the reaction of the reducing agent in the electroless plating solution. Even if the metal of the metal film 21 does not exhibit catalysis in the reaction of the reducing agent, pieces of a metal having a catalytic activity can be used to stir the plating solution in a barrel to activate the ends of the internal electrodes 4 and 5.

After the first plating layers 8 and 9 are formed by electroless plating, second plating layers 10 and 11 and third plating layers 12 and 13 can be easily formed by a conventional plating method.

To confirm that various preferred embodiments of the present invention are effective and advantageous, the following experimental examples were conducted.

EXAMPLE 1

Multilayer composites for monolithic ceramic capacitors were prepared for samples of the multilayer electronic component. The multilayer composite measured about 3.1 mm in length, about 1.55 mm in width and about 1.55 mm in height, and each included insulating layers made of a barium titanate-based dielectric insulating material and Ni-based internal electrodes. In the multilayer composite, the internal electrodes had a thickness of about 1.0 μm, and the insulating layers had a thickness of about 2.0 μm. The adjacent ends of the internal electrodes exposed at the same side surface were spaced from each other at a distance of about 4.0 μm.

Then, 200 multilayer composites and about 100 mL of Cu pieces having a diameter of about 1.3 mm were placed in a 300 mL horizontal rotary barrel. The same horizontal rotary barrels were prepared for Samples 1 to 7.

The rotary barrel was immersed in an approximately pH 6.0 Pd electroless plating bath (Pallatop N produced by Okuno Chemical Industries) having a temperature of about 60° C. and was rotated at a peripheral speed of about 2.6 m/min for a period of the rotation time of the corresponding sample of Samples 1 to 7 shown in Table 1. Thus, the exposed ends of the internal electrodes were coated with a Pd metal film.

To accelerate the oxidation of the Ni forming the internal electrodes, subsequently, the multilayer composites including the internal electrodes whose ends were coated with the Pd metal films were allowed to stand at a temperature of about 105° C. and a humidity of about 100% RH for about 4 hours.

The multilayer composites were disposed in the horizontal rotary barrel again, and the barrel was immersed in a Cu electroless plating bath having a temperature of about 40° C. The horizontal rotary barrel was rotated in this state at a peripheral speed of about 2.6 m/min to form about 3 μm thick Cu electroless plating layers as the first plating layers. The Cu electroless plating bath contained:

copper sulfate pentahydrate: about 0.04 mol/L
formaldehyde: about 0.16 mol/L
potassium sodium tartrate tetrahydrate: about 0.1 mol/L
polyethylene glycol: about 1.0 g/L
sodium hydroxide: about 0.125 mol/L The plating bath was subjected to aeration at about 0.5 L/min.

The side surfaces 6 or 7 of 100 samples extracted from the resulting monolithic ceramic capacitors were observed through an optical microscope. When at least about 5% in area of the exposed ends of the internal electrodes was not coated with the Cu plating layer, the sample was determined to be defective. The results are shown in Table 1.

Randomly selected sections of 50 monolithic ceramic capacitor samples were ground with a focused ion beam (FIB), and the thicknesses of the Pd metal films were measured by observation of scanning ion microscope (SIM) images. The average thickness obtained from the 50 samples was shown in Table 1.

TABLE 1

| Sample Number | Rotation time for Pd electroless plating (min) | Metal film thickness (μm) | Percentage of defectives (%) |
|---|---|---|---|
| 1 | 2 | 0.1 | 0 |
| 2 | 4 | 0.2 | 0 |
| 3 | 6 | 0.3 | 0 |
| 4 | 8 | 0.4 | 0 |
| 5 | 20 | 1 | 0 |
| 6 | 0 | 0 | 100 |
| 7 | 0.5 | 0.02 | 72 |

The results shown in Table 1 show that when the Pd metal films had thicknesses of about at least about 0.1 μm, the percentage of defective Cu plating layers was substantially zero.

EXAMPLE 2

The same multilayer composites as in Example 1 were prepared for samples of the multilayer electronic component.

Then, 200 multilayer composites and about 100 mL of Cu pieces having a diameter of about 1.3 mm were placed in a 300 mL horizontal rotary barrel. The same horizontal rotary barrels were prepared for Samples 11 to 15.

The rotary barrel was immersed in an approximately pH 6.0 Au substitution plating bath (Oel 2000 produced by Kojima Chemicals) having a temperature of about 80° C. and was rotated at a peripheral speed of about 2.6 m/min for a period of the rotation time of the corresponding sample of Samples 11 to 15 shown in Table 2. Thus, the exposed ends of the internal electrodes were coated with an Au metal film. Subsequently, the rotation barrel was immersed in an approximately pH 7.5 Au electroless plating bath (Neo Gold produced by Japan Pure Chemical) having a temperature of about 65° C., and was rotated at a peripheral speed of about 2.6 m/min for a period of the rotation time of the corresponding sample of Samples 11 to 15 shown in Table 2 to increase the thickness of the Au metal film.

In order to accelerate the oxidation of the Ni forming the internal electrode, subsequently, the multilayer composites including the internal electrodes whose ends were coated with the Au metal films were allowed to stand at a temperature of about 105° C. and a humidity of about 100% RH for about 4 hours.

The multilayer composites were placed in the horizontal rotary barrel again, and the barrel was immersed in an approximately pH 8.6 Cu electroplating bath (Pyrobright Process produced by Uemura Kogyo) having a temperature of about 55° C. The horizontal rotary barrel was rotated in this state at a peripheral speed of about 2.6 m/min while a current was applied at a current density of about 1.0 A/dm². Thus, Cu electroplating layers were formed to a thickness of about 3 μm as the first plating layers.

The Cu plating layers of 100 samples extracted from the resulting monolithic ceramic capacitor samples were observed for the percentage of coating with the Cu plating layer in the same manner as in Example 1, and the number of defectives was counted. The results are shown in Table 2.

Furthermore, the thicknesses of the Au metal films of 50 samples were measured in the same manner as Example 1. The average thickness obtained from the 50 samples was shown in Table 2.

TABLE 2

| Sample Number | Rotation time for Au substitution plating (min) | Rotation time for Au electroless plating (min) | Metal film thickness (μm) | Percentage of defectives (%) |
|---|---|---|---|---|
| 11 | 5 | 0 | 0.1 | 0 |
| 12 | 5 | 10 | 0.2 | 0 |
| 13 | 5 | 30 | 0.5 | 0 |
| 14 | 0 | 0 | 0 | 100 |
| 15 | 1 | 0 | 0.02 | 68 |

The results shown in Table 2 show that when the Au metal films had thicknesses of at least about 0.1 μm, the percentage of defective Cu plating layers was substantially zero.

EXAMPLE 3

The same multilayer composites as in Example 1 were prepared for samples of the multilayer electronic component. Then, 200 multilayer composites and about 100 mL of Cu pieces having a diameter of about 1.3 mm were placed in a 300 mL horizontal rotary barrel. The same horizontal rotary barrels were prepared for Samples 21 to 25.

The horizontal rotary barrel was immersed in an approximately pH 6.0 Pd electroless plating bath (Pallatop N produced by Okuno Chemical Industries) having a temperature of about 60° C. and was rotated at a peripheral speed of about 2.6 m/min for a period of the rotation time of the corresponding sample of Samples 21 to 25 shown in Table 3. Thus, the exposed ends of the internal electrodes were coated with a Pd metal film. Subsequently, the rotation barrel was immersed in an approximately pH 8.5 Pd electroplating bath (Palla 2000 produced by Kojima Chemicals) having a temperature of about 46° C., and was rotated at a peripheral speed of about 2.6 m/min for a period of the rotation time of the corresponding sample of Samples 21 to 25 shown in Table 3 while a current was applied at a current density of about 0.6 A/dm². Thus, the thickness of the Pd metal film was increased.

In order to accelerate the oxidation of the Ni forming the internal electrodes, subsequently, the multilayer composites including the internal electrodes whose ends were coated with the Pd metal films were allowed to stand at a temperature of about 105° C. and a humidity of about 100% RH for about 4 hours.

The multilayer composites were disposed in the horizontal rotary barrel again, and the barrel was immersed in the same Cu electroless plating bath as in Example 1. The horizontal rotary barrel was rotated in this state at a peripheral speed of about 2.6 m/min to form about 3 μm thick Cu electroless plating layers as the first plating layers.

The Cu plating layers of 100 samples extracted from the resulting monolithic ceramic capacitor samples were observed for the percentage of coating with the Cu plating layer in the same manner as in Example 1, and the number of defectives was counted. The results are shown in Table 3.

Furthermore, the thicknesses of the Pd metal films of 50 samples were measured in the same manner as Example 1. The average thickness obtained from the 50 samples was shown in Table 3.

TABLE 3

| Sample Number | Rotation time for Pd electroless plating (min) | Rotation time for Pd electroplating (min) | Metal film thickness (μm) | Percentage of defectives (%) |
|---|---|---|---|---|
| 11 | 0.5 | 30 | 0.1 | 0 |
| 12 | 0.5 | 60 | 0.2 | 0 |
| 13 | 0.5 | 120 | 0.5 | 0 |
| 14 | 0 | 0 | 0 | 100 |
| 15 | 0.5 | 0 | 0.02 | 68 |

The results shown in Table 3 shows that when the Pd metal films had thicknesses of at least about 0.1 μm, the percentage of defective Cu plating layers was substantially zero.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer electronic component comprising:
a multilayer composite including a stack of a plurality of insulating layers and an internal electrode primarily composed of a base metal and extending along interfaces between the plurality of insulating layers, one end of the internal electrode being exposed at a predetermined surface of the multilayer composite; and
a plating layer disposed directly on the predetermined surface of the multilayer composite so as to be electrically connected to the exposed end of the internal electrode; wherein
a metal film primarily composed of at least one metal selected from the group consisting of Pd, Au, Pt, and Ag is disposed only on the exposed end of the internal electrode and is not disposed on the predetermined surface of the multilayer composite.

2. The multilayer electronic component according to claim 1, wherein the base metal of the internal electrode is one of Ni or Cu.

* * * * *